E. A. WICKLINE.
CHANGE MAKER.
APPLICATION FILED JUNE 18, 1910.

1,007,167.

Patented Oct. 31, 1911.
5 SHEETS—SHEET 1.

Witnesses
D. D. A. Outcalt
V. Hamburg

Inventor
Everett A. Wickline
By P. S. Elliott
Attorney

E. A. WICKLINE.
CHANGE MAKER.
APPLICATION FILED JUNE 18, 1910.

1,007,167.

Patented Oct. 31, 1911.
5 SHEETS—SHEET 3.

Witnesses
D. D. A. Outcalt
V. Hamburg

Inventor
Everett A. Wickline
By R. J. Elliott
Attorney

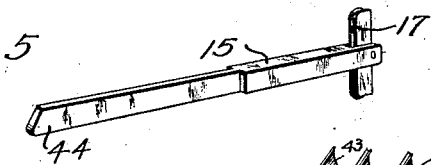
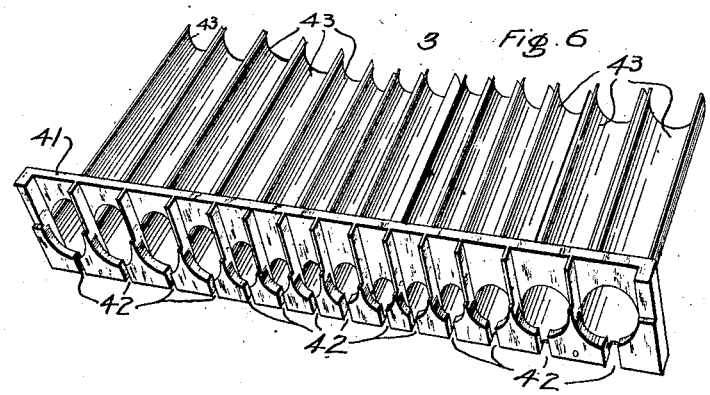
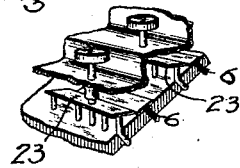
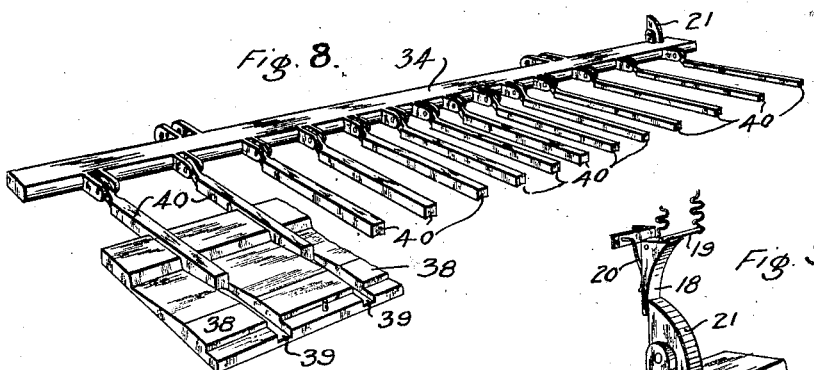
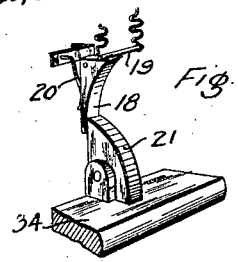
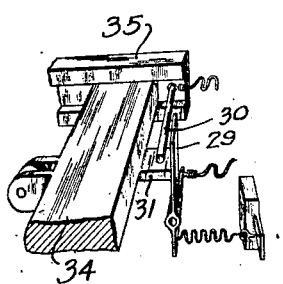

E. A. WICKLINE.
CHANGE MAKER.
APPLICATION FILED JUNE 18, 1910.

1,007,167.

Patented Oct. 31, 1911.
5 SHEETS—SHEET 5.

Witnesses
D. D. A. Orteatt
V. Hamburg

Inventor
Everett A. Wickline
By P. J. Elliott
Attorney

UNITED STATES PATENT OFFICE.

EVERETT A. WICKLINE, OF OLYMPIA, WASHINGTON.

CHANGE-MAKER.

1,007,167.  Specification of Letters Patent.  Patented Oct. 31, 1911.

Application filed June 18, 1910. Serial No. 567,540.

*To all whom it may concern:*

Be it known that I, EVERETT A. WICK-LINE, a citizen of the United States of America, residing at Olympia, in the county of Thurston and State of Washington, have invented certain new and useful Improvements in Change-Makers, of which the following is a specification, reference being had therein to the accompanying drawing.

This invention relates to change makers and has for its objects to provide a machine which will automatically release the least number of coins for any sum desired; which can be operated by one hand; which is set to give the change desired by pressing a single key; which will not deliver the sum required until the change is desired; which will automatically shut off the operating mechanism as soon as the change is delivered; and which if the wrong key has been pressed can be returned to normal condition without delivering the change indicated by said wrong key. I attain these and other objects by the devices, mechanisms and arrangements illustrated in the accompanying drawings in which—

Figure 1:
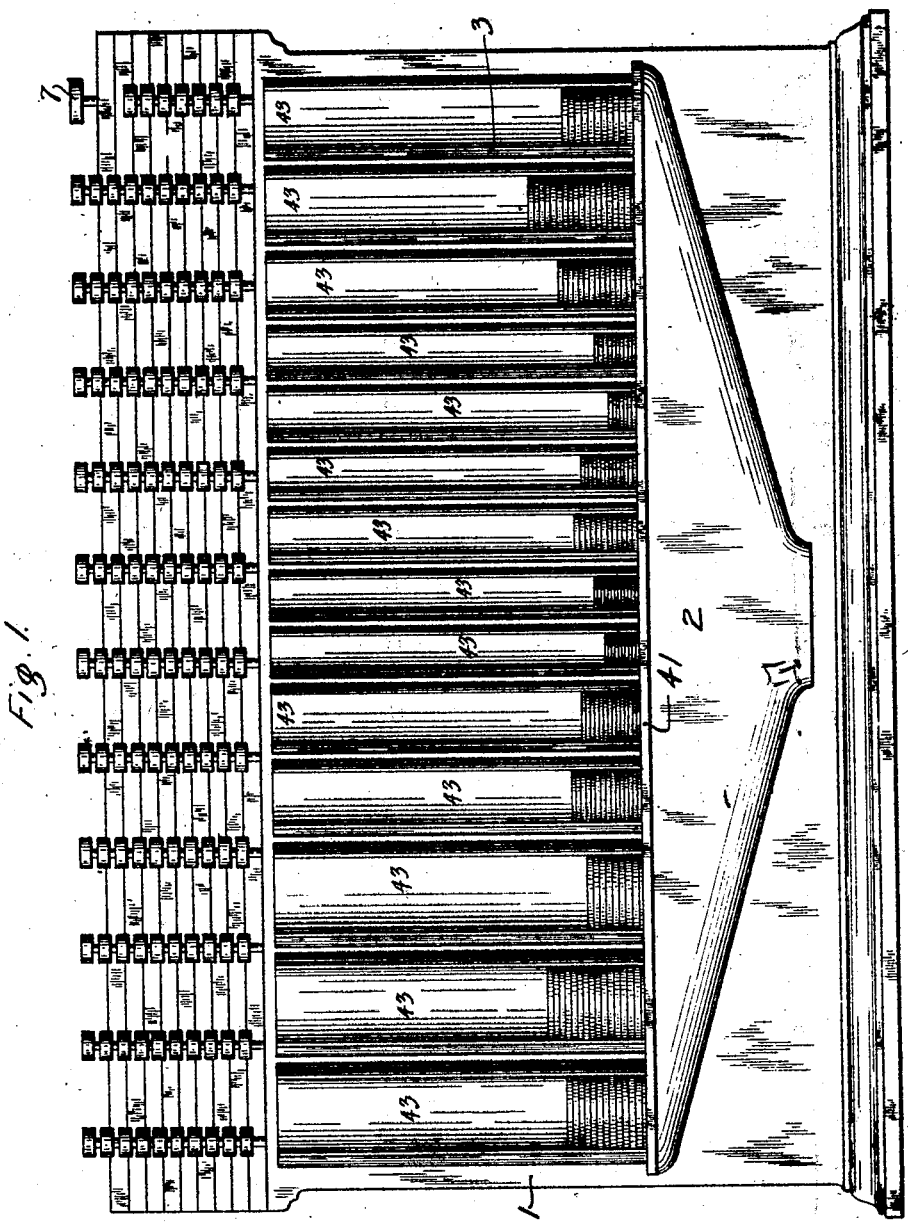
Figure 2:
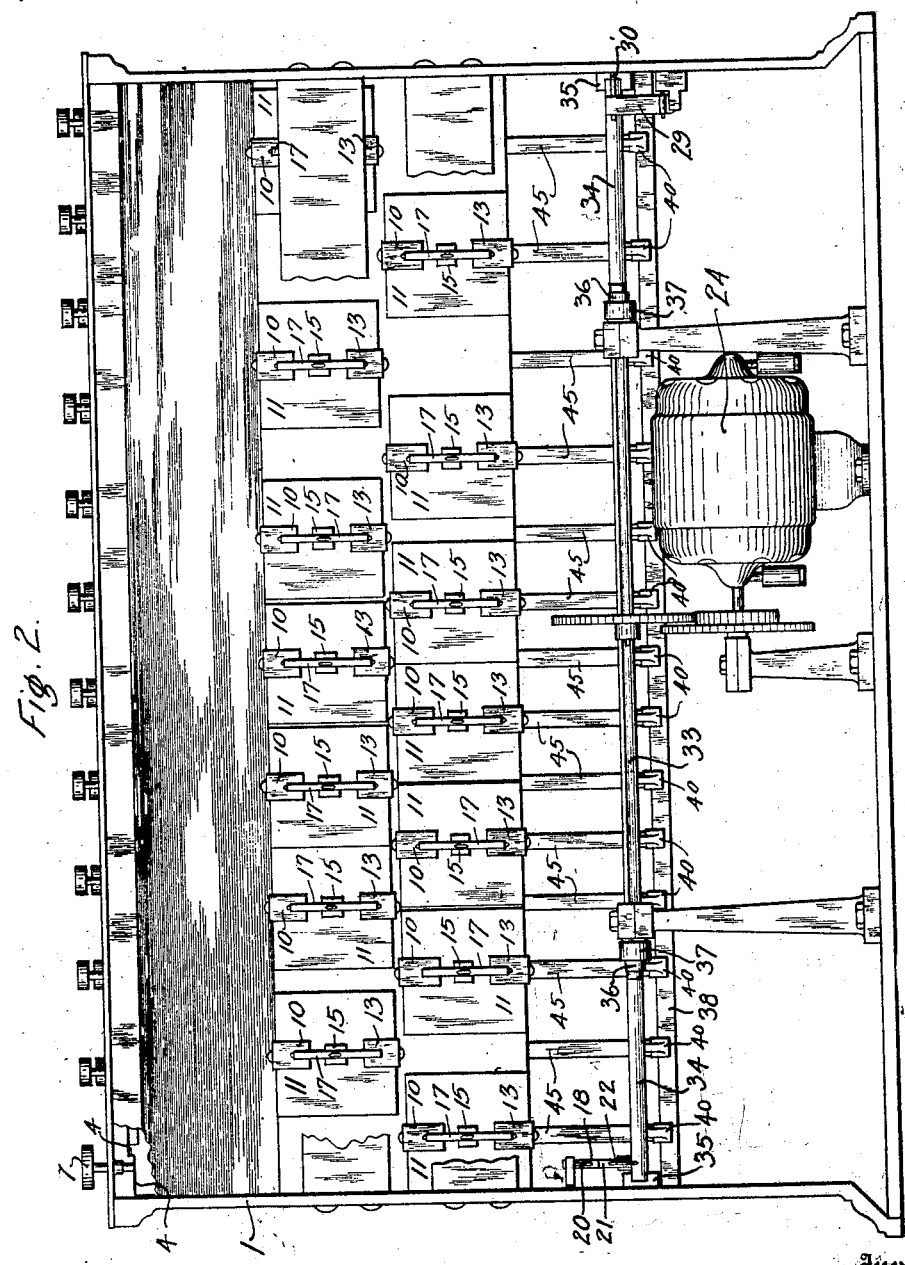
Figures 3, 4:
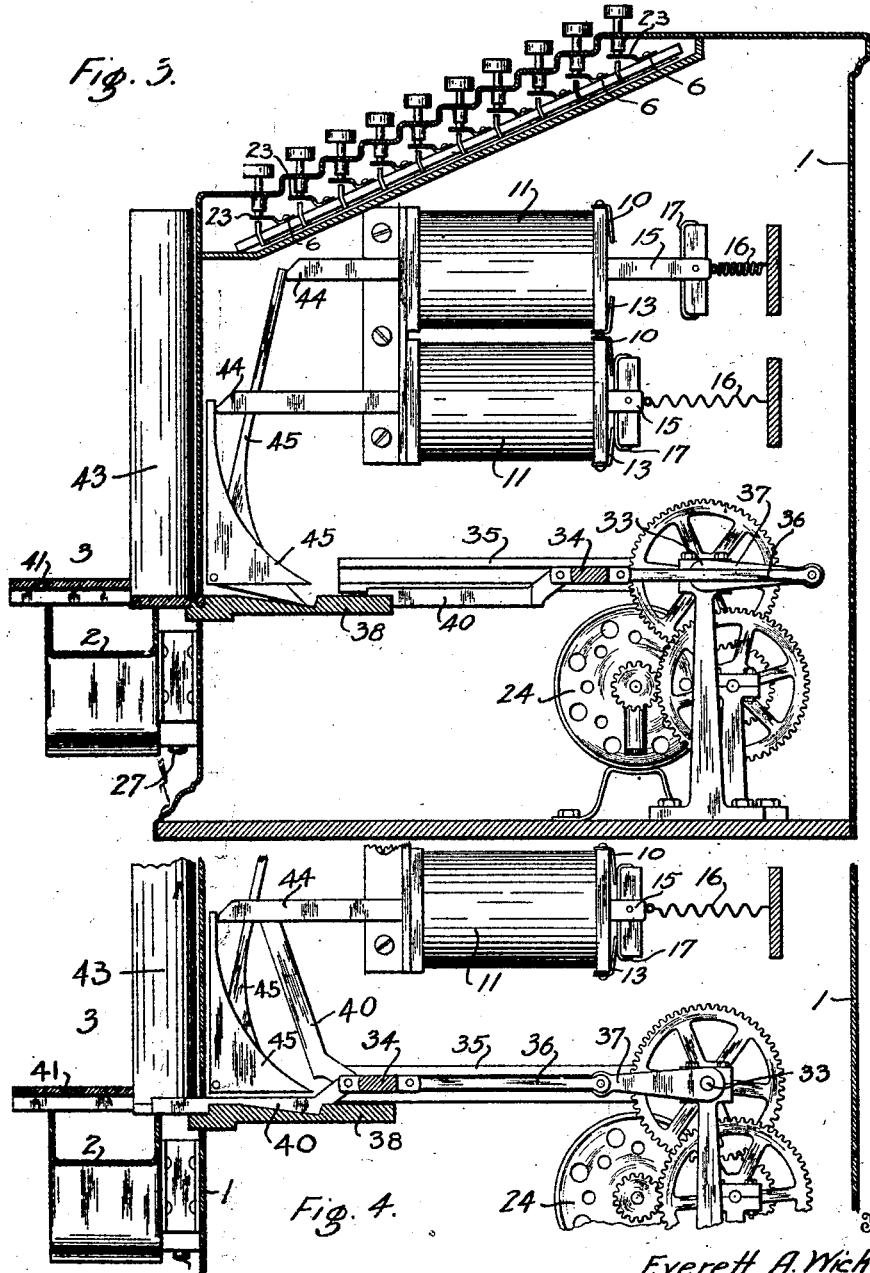
Figure 11:
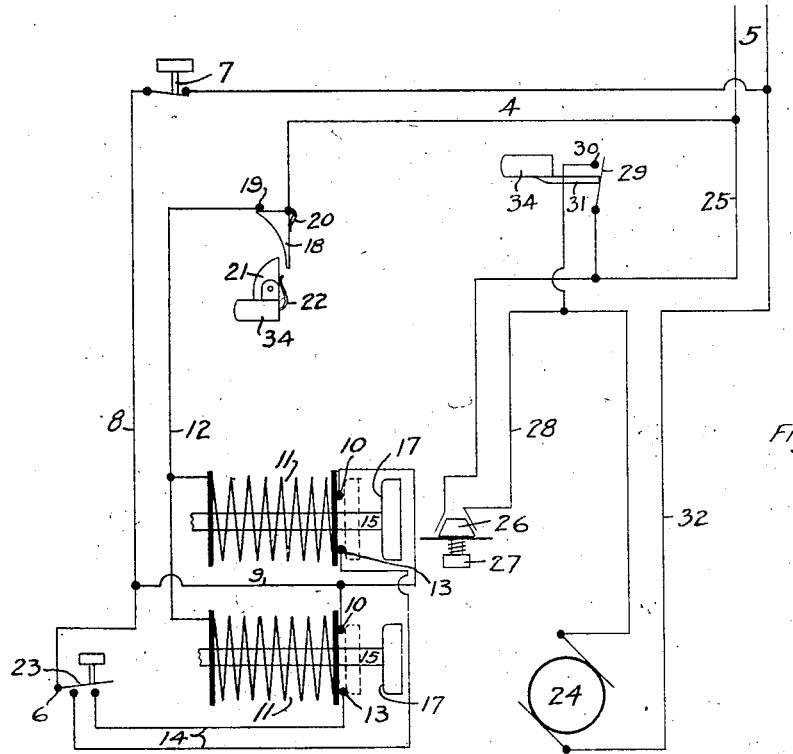
Figure 12:
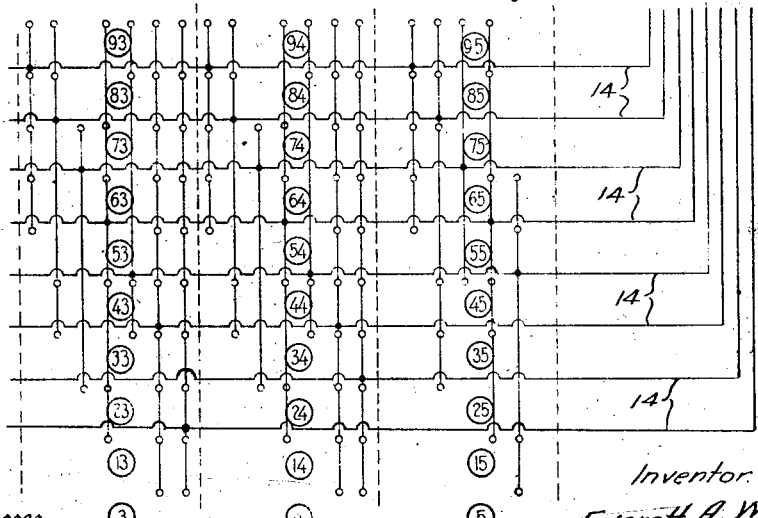

Figure 1 is a front elevation of the machine; Fig. 2 is a rear elevation thereof, the rear wall thereof having been removed to reveal the interior thereof; Fig. 3 is a vertical section of the machine showing the mechanisms in the positions occupied thereby after a key has been pressed and before the change has been delivered; Fig. 4 is a similar view of a portion of said mechanisms showing the positions occupied thereby after the change has been delivered; Fig. 5 is a perspective view of one of the cores of the electromagnets; Fig. 6 is a perspective view of the coin-rack; Fig. 7 is a perspective view of a portion of a key-board broken away to reveal the terminals arranged thereunder; Fig. 8 is a perspective view of the sliding carriage and finger bars mounted thereon; Fig. 9 is a perspective view of the automatic circuit breaker in the solenoid circuit; Fig. 10 is a perspective view of the automatic circuit make-and-break device; Fig. 11 is a diagrammatic illustration of the electric circuits; and Fig. 12 is a diagrammatic illustration of the arrangement of the circuits in a portion of the keyboard.

Similar numerals of reference refer to similar parts throughout the several views.

This invention is mounted in a suitable box-like frame 1, having a coin-trough 2 secured to the front thereof, a removable coin-rack 3 mounted above the coin-trough, a key-board on its upper inclined face, and containing the operating mechanisms and circuits within it. The operating mechanism may be conveniently divided into two parts, namely, the electric circuits, and the mechanical parts controlled and operated thereby.

Taking up first the electric circuits, it is noted that the main supply circuit is divided, on reaching the machine into a circuit which selects the coins to be delivered on pressing any particular key of the key-board, and into a motor and motor control circuit. Referring to Fig. 11 the key-board circuit 4 leads from the main circuit 5 to the terminals 6 which are common to all of the keys. A corrective circuit breaking key 7, through which the circuit is normally closed, is inserted in either of the main wires of the key-board circuit 4 and is adapted to break said circuit if the wrong key has been pressed. The wire 8, forming part of said circuit 4, which leads to the common terminal 6, above mentioned, is also connected by wires 9 to normally dead terminal pieces 10 which are mounted on the rear faces of all of the coin controlling solenoids 11, while the other wire 12 forming the other side of said circuit 4 is connected to one end of all of said solenoids 11. The other terminals 13 of each of said solenoids 11 are connected by means of separate wires 14 to the respective circuits in the keyboard, each of said wires 14 being connected to a number of terminals under the various keys so that the circuit will pass through any one of said solenoids when any one of the different keys may be pressed, (most of said keys being adapted to close the circuits in several of said solenoids). Each solenoid 11 is provided with a core 15 (Fig. 5) which is adapted to be drawn into the solenoid against the action of the spring 16 (Fig. 3) when the solenoid is energized, and each of said cores 15 carries on its outer end a cross piece on which a bare electric conductor 17 is mounted, said wire or conductor being suitably insulated from the cross piece and the core 14. The terminals 10 and 13 mounted on the rear faces of each of the solenoids 11 are arranged thereon in such position that when the core 15 is drawn inward by the solenoid the said wire 17 joins the two said terminals 10 and 13 so that the energizing current will then pass through the wire 17 and into the solenoid by way of the terminals 13. The result of this arrangement of circuits is that if any of the keys is pushed down to close the circuits of a number of solenoids the current passes from the wire 8 through the terminal 6, through the key, through the wires 14, and terminals 13, through the respective solenoids 11 to the other wire 12 of the circuit 4; this draws in the cores 15 of all of said solenoids and connects the terminals 10 and 13 of each of them together through the respective wires 17; as soon as the finger is withdrawn from the key the circuits through the terminals 6 and wires 14 are broken but the current then passes from the wires 8 by way of the wires 9 to the terminals 10, then through the wires 17 to the terminals 13 and then through the respective solenoids to the return wire 12 of the circuit 4. Thus it will be seen that when one of the keys is depressed a certain set of solenoids is energized and that when said key is released the solenoids continue to be energized. As hereinafter described, on pressing a certain other button a motor is started which operates the finger-bar-carriage. In the wire 12, of the circuit 4, is placed an automatic circuit breaker consisting of a plate 18 suitably pivoted to the frame and pressed against a terminal 19 by means of a spring 20; on the carriage of the finger-bars is pivotally mounted a contact piece 21 which is kept in position by a spring 22 and which is adapted to engage the plate 18 to break the circuit at the terminal 19. The position of these parts is such that the contact piece 21 engages the plate 18 when the carriage is at its extreme forward position, at which time the coins will have been delivered from the coin-rack to the trough. As soon as the circuit is thus broken the solenoids 11 are all demagnetized and the cores 15 are drawn outward therefrom by the springs 16 thus breaking the connections between the terminals 10 and 13 of the solenoid which had been energized. It is evident then that, after the coins have been delivered, the machine will not deliver any more coins until the circuit 4 has again been closed by pressing some one of the keys even should the motor continue to operate.

Referring principally to Fig. 12 it will be seen that the keys are arranged in columns and banks, those on a bank being consecutively numbered while those in a column all end with the same digit. The terminals which are engaged by the key contact plate 23 are arranged so that each of the wires 14 connects with a wire which joins all of the terminals of the same value in each of the columns of keys, thus one wire 13 which leads to the solenoid, which controls the stack from which single one-cent coins are delivered, connects with a wire which joins all the terminals in a column which have a value of one-cent and one of said wires will be found in the columns whose end digits are one, three, six and eight; similarly another wire 14 controls the solenoid, controlling the coin stack from which two one-cent pieces are delivered, is joined to a wire joining all the terminals in the column having a two-cent value on all the columns except those ending in nought, one, five and six; similarly there is another wire 14 which controls another solenoid of another stack adapted to deliver two one-cent coins and which leads to terminals in the columns ending in the digits four and nine; another wire 14 has similar connections and leads to terminals in all the columns, as have also the four other wires 14. The last five circuits lead respectively to the five solenoids which control the stacks of coins in which respectively are placed the five-cent pieces, ten-cent pieces, ten-cent pieces, twenty-five-cent pieces and fifty-cent pieces. Thus the terminals which control the coins which make up, for instance, seventy-three-cents are respectively connected to the wires 14 leading to the solenoids controlling the stack of fifty-cent, ten-cent, ten-cent, two one-cent and one-cent pieces.

Referring to the electric-circuit controlling and operating the motor 24, the wire 25 connects with the circuit 5 and leads to two switches: One of these switches 26 consists of a button 27 adapted to be pressed upward by one finger of the hand, into which the change is to be dropped, against the action of a suitable spring. This switch 26 connects the wire 25 to the wire 28 which leads to one terminal of the motor 24. The other switch (Fig. 10) consists of a pivoted arm 29 connected to the wire 25 adapted to engage a terminal 30 which is connected to said wire 28. A projection 31 is secured to the finger-bar carriage in such position as to engage the arm 29 to break the connection with the terminal 30 when the carriage has reached the end of its return stroke. The wire 32 joins the other terminal of the motor 24 to the circuit 5. Normally, when the machine is not in operation, the arm 29 does not engage the terminal 30. As soon however as the button 27 is pressed to close the circuit through the switch 26 the current passes through the wire 25, switch 26, and wire 28, through the motor 24, and by the wire 32 back to the circuit 5, thus driving the motor; as soon as the motor starts the carriage moves forward and the lug 31 is withdrawn from contact with the arm 29 thus closing the connection between the wires 25 and 28 through the arm 29 and terminal 30 so that when the finger is removed from the button 27 the circuit will not be affected and the motor will continue to turn until the carriage lug 31 again engages the arm 29 and breaks the motor circuit and stops the motor.

Referring now to the mechanical parts of the invention the motor 24 drives the crank-shaft 33 by any suitable means. The finger-bar carriage 34 extends from side to side of the machine and travels horizontally in guides 35 secured to the sides of the machine. Connecting rods 36 are suitably pivoted to the carriage 34 and to the cranks 37 of the crank-shaft. As the motor revolves the carriage 34 is therefore reciprocated in the guides 35. A table 38 is secured across the frame and is provided with suitable grooves 39 across its upper surface. The finger-bars 40 are pivotally secured to the carriage 34 and reciprocate with it but are free to travel either horizontally in said grooves 39 or to be turned on their pivots vertically as shown in Fig. 4. The coin-rack 3 consists of a plate 41 slotted at 42 on its rear side to correspond with the grooves 39 in the table 38. The plate 41 has a number of coin holders 43 secured to its upper side said holders being formed of parts of vertical cylinders and being of suitable sizes to receive and hold stacks of the various coins. These holders 43 are each over one of the slots 42 in the plate 41, the grooves 39 and finger-bars 40 being correspondingly spaced. The upper rear part of the plate 41 is cut away under each of the holders 43 and the lower front part is also cut in line with each of said holders, so that the coins in any of the stacks will be supported by the lower rear part of said plate and so that if the finger-bar 40 is pushed through the slot 42 it will engage the lowest coin or coins and will push them out from under the stack and allow them to fall therefrom. The coin-chute 2 is secured to the frame 1 as above described and is open along its upper edge and fits under the plate 41 so that the coins which are pushed from the stacks will fall into the chute and will be guided thereby to the orifice thereof from whence they fall into the hand or any other suitable receptacle. As above mentioned the plate 41 is cut on its rear upper face under each of the coin stacks but the extent of this cut will vary with the thickness of the coin in the stack and with the number of coins to be delivered from the stack, the distance between the upper front part of the plate and the lower rear part of the plate being such as to allow only the desired number of coins to pass therebetween from each stack. It is evident that as the carriage 34 moves forward it will force all the finger-bars 40 forward and that they will each deliver a definite coin to the chute unless they are prevented by some additonal means. This means comprises the solenoids 11 which draw the cores 15 into them; each of the cores 15 having an extension 44 adapted to pass through the solenoid and extend to the front thereof. Above each of the grooves 39 in the table 38 is pivoted a plate 45, having a substantially triangular shape with one side thereof concaved as shown in Figs. 3 and 4. The extensions 44 of the core 15 are each adapted to engage the upper end of one of these plates 45 and when the solenoid thereof is magnetized the said extension pushes the plate so that it turns on its pivot and raises the other corner thereof out of the plane of the groove 39 so that when the finger-bar 40 moves forward it will pass under the plate 45 as above described and the coin controlled by the solenoid will be delivered to the chute thereby; but, if the solenoid is not magnetized the spring 16 draws the core 15 out from the solenoid and thus allows the plate 45 to be tilted down so that its lower corner will rest below the plane of the finger-bar 40, then, as the finger bar advances, it engages the concave side of the plate 45 and, turning on its pivotal connection with the carriage 34, it slides up the plate and therefore does not pass into the slot 42 under the coin stack and the coins therein are not delivered into the chute. It is evident then that when a key completes a certain number of circuits certain solenoids are magnetized and the finger-bars are free to push out the coins corresponding therewith as soon as the carriage 34 moves forward, but that all the other coin-bars will simply be raised out of their operating planes by the plates 45.

From the above description it will be seen that when a key is pressed certain solenoids are magnetized and that they simultaneously operate their respective plates 45; that, when it is desired to receive the coins corresponding with the key which has been pressed, the hand is placed under the orifice of the chute and the button 27 is pressed upward thus starting the motor and driving forward the carriage 40; that the finger-bars, which are in line with the plates whose corners have been raised by the respective solenoids, will advance thereunder and push the lowest coins from the respective stacks into the hand; that as soon as the carriage has reached its foremost position the solenoid circuits are automatically broken and the cores fly outward therefrom; that, as the carriage returns, the plates 45 assume their normal downward-tipped positions; and that when the carriage reaches its innermost position the motor circuit is broken and the motor stopped in this position.

It is evident that a great variety of combinations of coins can be secured by having suitable keys and connections on the keyboard. The legends on the keys may either indicate the value of the coins delivered or may indicate the sum for which the coins delivered are the change from a certain standard coin (as one-dollar). It is further evident that this same invention may be utilized in connection with coins of various countries and denominations without departing from the main idea thereof, suitable changes being made in the sizes of the coin holders and in the combinations of the solenoids used.

Having described my invention, what I claim is:

1. In a change maker, the combination with means for holding a plurality of stacks of coins; of an electric motor; a carriage reciprocated by said motor; finger bars pivoted to said carriage and each adapted to eject the lower coins from one of said stacks; pivoted plates normally lying in the paths of said finger bars to divert them from engaging said lower coins; and electro-magnetic mechanism whereby any of said pivoted plates may be removed from the paths of said finger bars.

2. In a change maker, the combination with means for holding a plurality of stacks of coins; of an electric motor; a carriage reciprocated by said motor; finger bars pivoted to said carriage and each adapted to eject the lower coins from one of said stacks; pivoted plates normally lying in the paths of said finger bars to divert them from engaging said lower coins; a plurality of electromagnets each adapted, when energized, to remove one of said pivoted plates out of the path of the finger bar; and an electric circuit joining one terminal of all of said electro-magnets, and dividing into a series of separate key-controlled circuits each connected to the other terminal of each of said electro-magnets, a plurality of keys being in each of said divided circuits and connected in parallel therein.

3. In a change maker, the combination with means for holding a plurality of stacks of coins; of an electric motor; a carriage reciprocated by said motor; means mounted on said carriage to eject the lower coins from said stacks; means adapted to normally divert any of said ejecting means; a plurality of electromagnets each adapted, when energized, to withdraw any of said diverting means; an electric circuit joining one terminal of all of said electromagnets, and dividing into a series of separate key-controlled circuits each connected to the other terminal of each of said electromagnets, a plurality of keys being in each of said divided circuits; and an automatic circuit breaker in said common circuit and adapted to be engaged and operated by said carriage when it is at the end of its stroke whereby all of said electromagnets are demagnetized when the coins have been ejected.

4. In a change maker, the combination with means for holding a plurality of stacks of coins; of an electric motor; a carriage reciprocated by said motor; means mounted on said carriage to eject the lower coins from said stacks; an electric circuit leading to said motor; a spring-resisted hand-operated switch in said circuit whereby said motor is started; and a circuit breaker, connected in parallel with said hand-operated switch, and engaged and operated by said carriage and adapted to break the motor circuit to stop the motor.

In testimony whereof I affix my signature in presence of two witnesses.

EVERETT A. WICKLINE.

Witnesses:
A. M. RICHARDS,
D. A. FREEMAN.